SEMICONDUCTOR WITH MULTILAYER CONTACT
Filed March 2, 1971
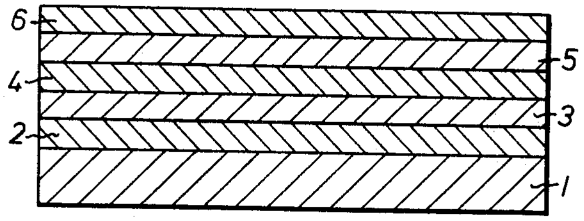
INVENTORS.
Rigobert Schimmer
Horst Gesing
Karl-Heinz Cordes
BY Spencer & Kaye
ATTORNEYS.

United States Patent Office 3,706,015
Patented Dec. 12, 1972

3,706,015
SEMICONDUCTOR WITH MULTILAYER CONTACT

Rigobert Schimmer and Horst Gesing, Belecke, and Karl-Heinz Cordes, Warstein, Germany, assignors to Licentia Patent Verwaltungs-G.m.b.H., Frankfurt am Main, Germany Filed Mar. 2, 1971, Ser. No. 120,220
Claims priority, application Germany, Mar. 3, 1970, P 20 09 863.9
Int. Cl. H01l 3/00, 5/00
U.S. Cl. 317—234 R 10 Claims

ABSTRACT OF THE DISCLOSURE

A semiconductor having a contact composed of a layer located immediately on the semiconductor and made of the combination of an adherent metal and a low contact-resistance metal, a layer situated on the combination layer and being substantially solder-insoluble and wettable, a second wettable layer situated on the solder-insoluble and wettable layer, and at least one etchant-resistant layer situated on the second wettable layer.

BACKGROUND OF THE INVENTION

The present invention relates to a contact layer sequence on a semiconductor, especially a diffused silicon component such as a silicon diode.

Numerous layers and layer sequences are known for contacting silicon components such as rectifiers and transistors. Besides having the lowest contact resistance possible, they must satisfy a series of other requirements, in order that faultless operation of the component be guaranteed. Among these other requirements are a good adherence to the silicon, good solderability, good resistance to temperature changes, small differences between the coefficients of thermal expansion, good wettability, good heat conductivity, prevention of undesired diffusion processes, prevention of embrittlement during soldering, and good etchant resistance.

It has not been possible to obtain all of these requirements or even a majority of them, and yet provide a contact structure that gives reproducible results without fail during manufacture.

SUMMARY OF THE INVENTION

An object of the present invention, therefore, is to provide a contact for semiconductor components which is adapted for yielding reproducible results and which is distinguished by small contact resistances and good adherence, good resistance to temperature changes, good solderability, and good etchability.

This as well as other objects which will become apparent in the discussion that follows are achieved, according to the present invention, by a contact layer sequence including immediately on a semiconductor body a layer made of the combination of a metal of high adherence with a metal of low contact resistance, on this combination layer a layer of easily wettable metal which is substantially resistant to being dissolved by solder, on this easily wettable layer a second easily wettable metal layer, this second easily wettable layer being covered by one or more etchant-resistant metals.

BRIEF DESCRIPTION OF THE DRAWING

The single figure of the drawing is an elevational section through a semiconductor device constituting one embodiment of the present invention.

DESCRIPTION OF THE PREFERRED EMBODIMENTS

Referring to the single figure, semiconductor body 1 has located immediately on it a layer 2 made of a combination of a metal of high adherence with a metal of low contact resistance, for example a layer made of chromium and vanadium. This combination layer has situated on it a metal layer 3 which is substantially solder-insoluble and wettable, for example nickel.

On metal layer 3 is a second easily wettable layer 4, for example of silver. Situated on this second easily wettable layer 4 is an etchant-resistant layer 5 or layer sequence 5, 6, of gold and/or chromium.

In a preferred embodiment of a combination layer on a diffused piece of silicon, a layer formed of chromium as the metal of high adherence and vanadium as the metal of low contact resistance is used. The vanadium content is in the range of about 10 to 70%, by weight, and preferably 35 to 40%, by weight. The two metals are deposited simultaneously, preferably in a simultaneous vacuum evaporation process.

Nickel is a preferred metal for the layer which is substantially solder-insoluble and wettable. It prevents any solder which might eat through upper layers (for example a silver upper layer) from reaching the chromium-vanadium alloy of the combination layer. The nickel is applied in vacuum—thus in the absence of oxygen—and consequently presents a surface free of oxides and having the required good wettability.

Silver is a preferred metal for the second wettable layer situated on the solder-insoluble and wettable nickel layer. Silver has the advantage over gold that it is not embrittled by soft solder and is cheaper.

On the silver layer, a preferred first etchant-resistant metal layer is made of gold, and on this gold layer is placed a second etchant-resistant metal layer preferably of chromium, which is resistant to extended exposure to an etchant such as a mixture of hydrofluoric acid and nitric acid.

The combination layer of chromium and vanadium provides at the same time a good adherence of the contact to the semiconductor body and a low electrical contact resistance between the contact and the semiconductor body. Thus, the invention offers the added advantage of low contact resistance as compared with the case where the immediate contact to the semiconductor body is obtained with just chromium. While chromium alone does give good adherence, it has the disadvantage of undesirably high contact resistance—especially in the case of low dopant concentrations in the silicon.

If only vanadium is used as the immediate contact to a semiconductor body, a relatively low contact resistance is achieved, but a poorer adherence is obtained. This makes faulty products more likely and thus makes the process more expensive, for example during etching of the semiconductor body before the metal evaporation process.

Surprisingly, the combination layer of the invention retains the advantageous properties of both of its components while eliminating the disadvantageous properties of each taken alone, so that both good adherence and low contact resistance are obtained at the same time.

Further illustrative of the invention is the following example:

A silicon wafer doped basically with phosphorus at $5\cdot10^{13}$ atoms/cm.$^3$ having a net diffused boron dopant concentration of $>5\cdot10^{20}$ atoms/cm.$^3$ at its upper surface, to form a diode, is prepared for contacting on its surface as follows: The wafer is treated for 10 minutes at 20° C. with a solution of hydrofluoric acid having a concentration of 40% and rinsed with deionised water and etched with a solution of Cp 6 (two parts, by volume, of nitric acid, $\rho=1.51$, one part, by volume, of hydrofluoric acid having a concentration of 40%, one part, by volume, of acetic acid having a concentration of 100%) for 12 seconds at 20° C.

The wafter is then held between steel masks at 150° C. in a vacuum chamber having a pressure of $<1\cdot10^{-5}$ mm. Hg. Chromium and vanadium are heated to 1600° C. in a crucible and then a shield is removed from between the crucible and the wafer. Vapor deposition is allowed to proceed on the upper surface for 1 minute to give a combination layer of chromium and vanadium on the wafer, having a thickness of 0.01 micron, and a composition of 42%, by weight, vanadium, 58%, by weight, chromium, and the remainder impurities as follows manganese, iron, nickel, as determined by spark emission spectroscopy. Next, a nickel layer is deposited in the same vacuum chamber under the same conditions, the nickel being heated in an electronic beam gun, the deposition time being 30 minutes, to give a layer completely coating the combination layer and having a thickness of 0.6 microns. Next, a silver layer is deposited in the same vacuum chamber under the same conditions, the silver charge being heated to a temperature of 1200° C., the deposition time being 15 minutes, to give a layer completely covering the nickel layer and having a thickness of 2 microns. Next, a gold layer is deposited in the same vacuum chamber under the same conditions, the gold being heated to 1200° C., the deposition time being 10 minutes, to give a layer completely covering the silver layer and having a thickness of 0.8 micron. Next, a chromium layer is deposited in the same vacuum chamber under the same conditions, the chromium charge being heated to 1600° C., the deposition time being 30 minutes, to give a layer completely covering the gold layer and having a thickness of 0.7 micron. The thus contacted silicon wafer is then exposed to an etchant solution consisting of Cp 6 and separated in pellets.

The pellets are treated with a weak solution of hydrochloric acid until the chromium layer is removed and then etched for 5 seconds in a solution of Cp 6.

A silver wire is then soldered to the contact with a solder of 70% lead and 30% indium with a maximum temperature of 305° C. in a belt furnace.

It will be understood that the above description of the present invention is susceptible to various modifications, changes and adaptations and the same are intended to be comprehended within the meaning and range of equivalents of the appended claims.

We claim:

1. A semiconductor device including a piece of semiconductor material and a contact on said piece, said contact providing a location on which a conductor can be soldered to said piece and comprising a layer located immediately on said piece and made of an alloy of an adherent metal and a low contact-resistance metal, said alloy consisting essentially of chromium and vanadium, a layer situated on said alloy layer and being substantially solder-insoluble and wettable, a second wettable layer situated on said solder-insoluble and wettable layer, and at least one etchant-resistant layer situated on said second wettable layer.

2. A device as claimed in claim 1, wherein said semiconductor material is silicon.

3. A device as claimed in claim 1, wherein said alloy contains 10 to 70%, by weight, vanadium.

4. A device as claimed in claim 3, wherein said alloy contains 35 to 40%, by weight, vanadium.

5. A device as claimed in claim 3, wherein said layer which is substantially solder-insoluble and wettable consists essentially of nickel.

6. A device as claimed in claim 5, wherein said second wettable layer consists essentially of silver.

7. A device as claimed in claim 6, wherein said at least one etchant-resistant layer consists essentially of gold.

8. A device as claimed in claim 7, further comprising a second etchant-resistant layer consisting essentially of chromium.

9. A device as claimed in claim 2, wherein said alloy consists of 10 to 70%, by weight, vanadium, and chromium as the remainder, said substantially solder-insoluble and wettable layer consists of nickel, said second wettable layer consists of silver, said at least one etchant layer consists of gold, and further comprising a second etchant-resistant layer situated on said etchant-resistant layer of gold and consisting of chromium.

10. A semiconductor device comprising a body of silicon, and an alloy consisting essentially of 10 to 70%, by weight, vanadium, the remainder being chromium, located immediately on said body.

References Cited

UNITED STATES PATENTS

| | | | |
|---|---|---|---|
| 3,413,711 | 12/1968 | Brewer et al. | 317—234 |
| 3,609,472 | 9/1971 | Bailey | 317—234 |
| 3,633,076 | 1/1972 | Arnt | 317—234 |
| 3,436,614 | 4/1969 | Nagatsu et al. | 317—234 L |
| 3,582,324 | 6/1971 | Kunert et al. | 317—234 L |
| 3,599,060 | 8/1971 | Triggs | 317—234 M |

FOREIGN PATENTS

| | | | |
|---|---|---|---|
| 6,702,273 | 9/1967 | Netherlands | 317—234 |

JOHN W. HUCKERT, Primary Examiner

A. J. JAMES, Assistant Examiner

U.S. Cl. X.R.

317—234 L, 234 M; 29—589